G. P. HAYNES.
VALVE.
APPLICATION FILED FEB. 27, 1917.
1,324,351.
Patented Dec. 9, 1919.
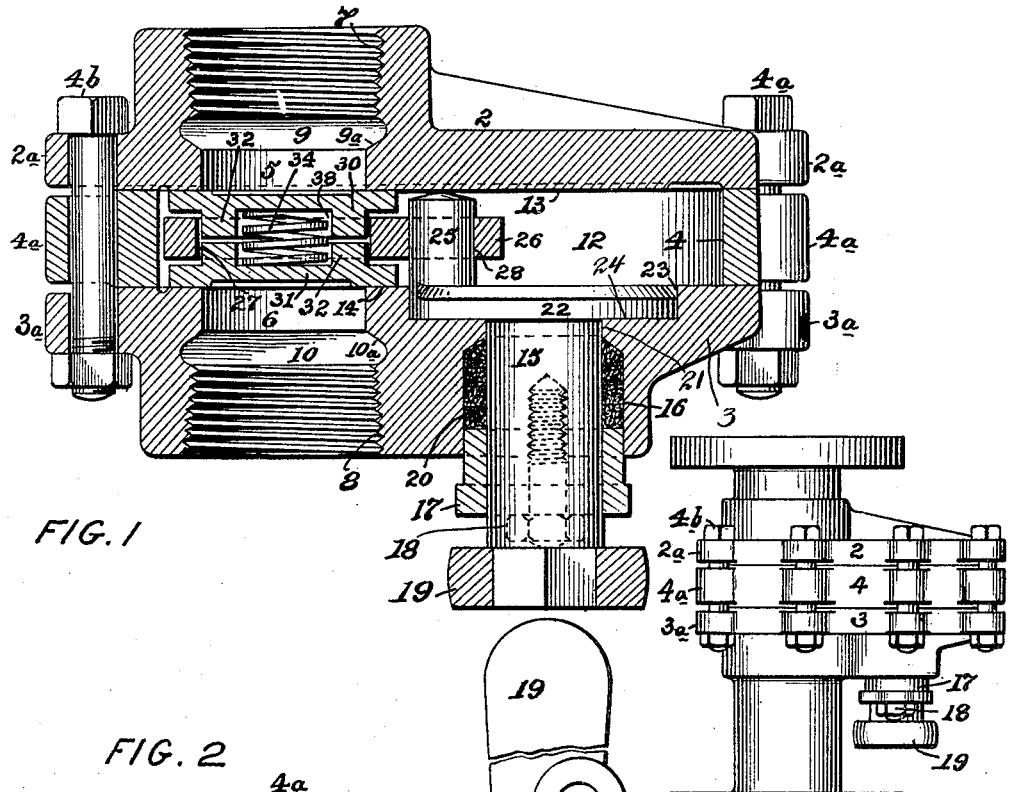
FIG. 1
FIG. 2
FIG. 3
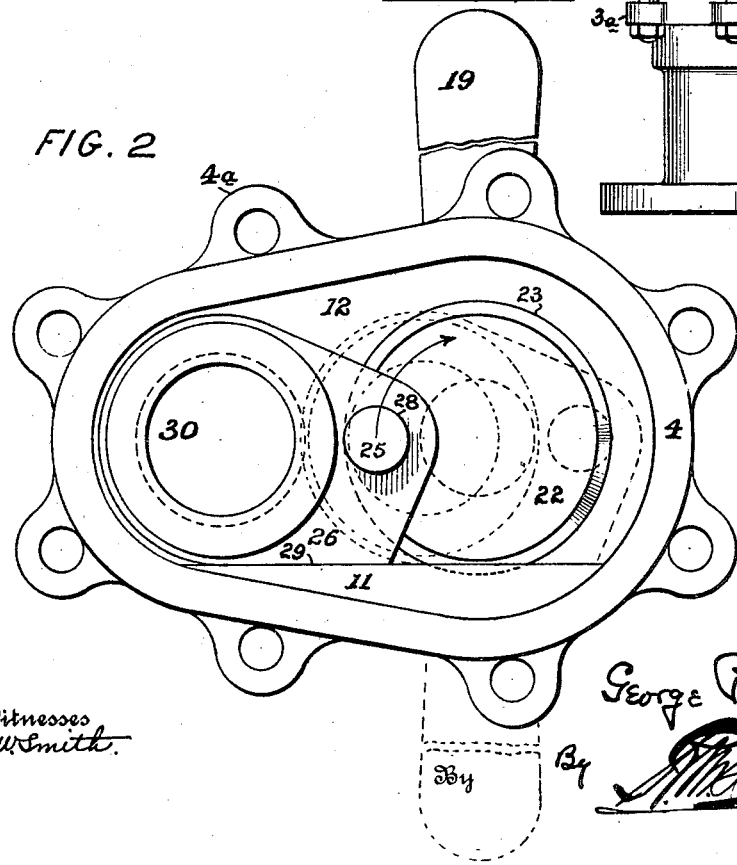
Witnesses
E. W. Smith.
Inventor
George P. Haynes
By
Attorney

UNITED STATES PATENT OFFICE.

GEORGE P. HAYNES, OF JERSEY CITY, NEW JERSEY, ASSIGNOR TO PATTERSON-ALLEN ENGINEERING COMPANY, A CORPORATION OF NEW YORK.

VALVE.

1,324,351.  Specification of Letters Patent.  Patented Dec. 9, 1919.

Application filed February 27, 1917. Serial No. 151,350.

*To all whom it may concern:*

Be it known that I, GEORGE P. HAYNES, a citizen of the United States, and resident of Jersey City, county of Hudson, and State of New Jersey, have invented an Improvement in Valves, of which the following is a specification.

The object of my invention is to provide a construction of quick-acting valve which shall be easily operated against high pressures, simple in construction, durable, and adapted to automatically compensate for wear.

More particularly, my improvements refer to that type of valve in which there is a casing with oppositely arranged ports to provide a through passage, and having between them valve devices for controlling the ports and operable by a rock shaft whereby it is quick-acting and shifted by a sliding motion.

My invention in its more specific form consists of a valve casing having inlet and outlet ports in alinement, oppositely directed valve pieces for the respective ports and spring pressed upon the valve seats surrounding said ports, a rock shaft journaled in the casing and provided with a crank pin, and a link journaled upon the crank pin and having the oppositely directed valve pieces received therein so that they are moved with the link during the manipulation of the rock shaft.

My invention also consists of improvements hereinafter described whereby the above objects and results are attained, said improvements comprising certain organization and combination of parts which are fully described hereinafter and more particularly defined in the claims.

For the purpose of illustrating my invention, I have shown in the accompanying drawings the embodiment thereof which is at present preferred by me, since the same is in form to give satisfactory and reliable results, but it is to be understood that the several instrumentalities of which my invention consists, can be variously arranged and organized and that my invention is not limited to the precise arrangement and organization of the instrumentalities herein shown and described.

Referring to the drawings:—Figure 1 is a sectional elevation through my improved valve device; Fig. 2 is a plan view thereof with one of the side plates removed; and Fig. 3 is a side elevation showing my improved valve with flanged inlet and outlet ports.

The body of the valve consists of an oblong annular middle portion 4 having about its outer part a plurality of lugs $4^a$ having holes for bolts, and this body part is closed on one side by a plate 2 and on the other side by a plate 3, which plates also have lugs $2^a$ and $3^a$ respectively. These several plates and the body part 4 are accurately faced and are bolted together as shown by bolts $4^b$ which pass through the holes in the lugs $2^a$, $3^a$ and $4^a$. The plate 2 is provided with a port 5 opening upon the interior of the valve casing through a valve seat 13, and the outer end of the said port 5 communicates with an enlarged threaded aperture 7 into which the pipe may be screwed through which the steam or fluid may be supplied to or from the valve. I prefer that between the port 5 and the screw threaded portion 7 the walls shall be undercut as indicated at 9, and providing a somewhat conical surface at $9^a$ leading into the port 5. The plate 3 is provided with the port 6 opening through the face 14 constituting the valve seat and in alinement with the port 5 of plate 2, and this port communicates with the outer screw threaded aperture 8 and with an intermediate undercut portion 10 having the conical surface $10^a$ corresponding in all material respects to those associated in connection with port 5 above described. The plate 3 is also provided with a circular depression or recess 23 (to one side of the port 6), and having a flat annular seat 24, and also provided with a shaft bearing 21, the same opening into a stuffing-box 16 which is directed outwardly. 17 is the gland of the stuffing-box and is adjusted by means of bolts 18, and packing 20 is employed in the stuffing-box for making a tight joint around the rock shaft 15 which extends through the stuffing-box.

The rock shaft 15 extends through the stuffing-box 16, and at its outer end it is provided with a lever 19 or other suitable means for rocking it. It is therefore journaled in the bearing 21 at the inner end of the stuffing-box and in the gland 17. The inner end of the shaft 15 is formed integral with an extended flanged head 22 which is circular in circumference and flat on the under side and fits snugly into the depression 23 in the plate 3 and tightly seats upon the annular bearing surface 24. This flanged head 22 is provided with a crank stud 25 which extends transversely across the valve chamber and preferably close to the surface 13 of the plate 2. In this manner, the rock shaft is properly positioned in the plate 3 and forms a tight joint therein while at the same time having freedom for rocking motion. By employing the flange 22 at the inner end of the rock shaft 15, I am not only enabled to provide a tight joint by pressure of this plate upon its seating surface 24, but this large diameter of the flange holds the rock shaft in operative position while being rocked and removes excessive strain upon the gland and packing of the stuffing-box. The steam or fluid pressure, as the case may be, within the valve chamber positively forces the flange 22 tightly upon its seat 24 and makes the joint so tight that relatively small duty is put upon the stuffing-box, and consequently the valve may be operated for a long time without necessity of repacking.

30 and 31 are two valve pieces adapted to respectively slide over the valve seats 13 and 14 formed about the respective ports 5 and 6. These valve pieces are preferably circular and with a circular back flange 32 which, when the two valve pieces are alined, provide a central chamber 33 and an annular recess about the valve pieces. In the central chamber is arranged a coil spring 34 whose opposite ends press respectively upon the central portions of the two valve pieces 30 and 31 to force them upon their respective seats. These valve pieces do not quite touch so as to prevent any interference one with the other in properly coöperating with their seats. The valve pieces are connected with the crank pin or stud 25 by means of a link 26. This link is hinged upon the stud 25 which extends through a hole 28 therein, and is provided with a large hole 27 into which the annular flanges 32 of the valve pieces extend from opposite sides. The fit between these parts is reasonably snug so that there is no objectionable play when reversing the motion of the valve, but the joints must be sufficiently loose not to cause binding. It will thus be seen that the valve pieces are journaled as it were in the link 26, but being preferably uniformly distributed about the axial line there is little tendency to rotate, except when in the act of opening and closing the valve piece in respect to the port when the extent of friction on one part is slightly greater than at another part due to the different extent of surface in contact and the different speed of motion at different parts of the circumference. Any movement of the valve piece axially, while being shifted from closed to open position and vice versa, has a tendency to make the parts wear evenly and maintain a tight joint. By reference to Fig. 2, it will be observed that one side of the link 26 is provided with a flat edge 29 which, when the valve is closed, rests flat against a straight guide 11 at one side of the interior of the valve body and formed in the side wall of the part 4. This feature of the construction insures the proper positioning of the valve pieces over the ports in the closed condition of the valve as shown, for otherwise there would be nothing to position the link and insure the valve pieces against binding on the sides of the case. It will also be observed that the link has its side edges extending somewhat beyond the valve pieces so that under no circumstances can the valve pieces strike the side walls of the case.

In operation and assuming the apparatus to be in condition shown in the drawings, it will be understood that when the rock shaft 15 is given a rotary motion the crank pin 25 will travel in the direction of the arrow, Fig. 2. The result of this is to draw the link 26 away from the guide 11 and slightly rotate it upon the valve pieces. During this operation, the valve pieces are very gradually shifted over the ports to cause a very gradual opening thereof, and when the pressure is thus relieved, the further movement of the crank pin causes a gradually quicker shifting of the valve pieces and then a gradually slower movement thereof until a semi-revolution has been made to the rock shaft. When this is accomplished, the link will be again returned into contact with the guide 11 and will once more bring the valve pieces to the medial line in the valve case, as indicated in dotted lines. In this manner, the valve pieces will be shifted without any tendency to objectionable freedom of travel. In reversing this operation for closing the valve, it will be noted that the first action will be to rock the link about the valve pieces while very slightly shifting them, and without removing the large end of the link from the guide 11, and thereafter a continuance of the return movement will cause this link to slide along the guide 11 to position the valve pieces over the ports and then bring the link positively to rest by having its flat surface 29 contact with the guide 11, as indicated in solid lines in Fig. 2. It will be seen from this that at no time is there any possibility for very great digression of the valve pieces from rectilinear motion, but such slight movement as does occur in the opening of the valve piece will tend to gradually work the valve pieces about their axes and in that way maintain a better operative valve structure by distributing the wearing tendencies.

The valve bodies may be made from forged steel or from castings as preferred, and I do not restrict myself in this respect. Similarly, the inlet and outlet apertures 7 and 8 may be screw threaded as shown in Fig. 1, so that the valve can be screwed upon pipes, or where flanged joints are required, these inlet and outlet portions may be made with flanges as indicated in Fig. 3.

It is manifest that this valve is double acting, and either port may be the inlet or the outlet port, as convenience may dictate. Furthermore, there being two valve pieces properly seating upon separate seats and controlling each of the ports 5 and 6, it is manifest that the valve is tighter than would be the case where a single valve piece alone is used in a non-reversible valve.

While I have shown the valve body as made of three parts, 2, 3 and 4, having planed surfaces without packing, it is manifest that I do not restrict myself from the employment of packing between the joints if such is desired, as the employment of such packing would be common engineering practice. Furthermore, while I prefer to make the valve body in three pieces, I in no way restrict myself to this detail, as the valve body may be formed in any suitable manner provided it furnishes the proper ports, seats and provision for operating the rock shaft.

It will now be apparent that I have devised a novel and useful construction which embodies the features of advantage enumerated as desirable, and while I have in the present instance shown and described the preferred embodiment thereof which has been found in practice to give satisfactory and reliable results, it is to be understood that I do not restrict myself to the details, as the same are susceptible of modification in various particulars without departing from the spirit or scope of the invention.

Having now described my invention, what I claim as new and desire to secure by Letters Patent, is:—

1. In a valve, the combination of a body having a valve chamber provided with oppositely directed inlet and outlet ports and valve seats therefor and also having a guiding surface to one side of the ports and valve seats and in a plane intermediate thereof, with a crank shaft journaled in the body and having a crank pin within the valve chamber the said crank shaft adapted to make a semi-revolution, a link loosely journaled upon the crank pin and having a flat edge adapted to the guide surface within the valve body and acting as an abutment to limit the throw of the crank in each direction in opening and closing the valve the said link oscillating upon the guide surface and traveling along the same during the movement of the crank pin, and valve pieces sleeved in the link at a distance from the crank pin and supported in contact with the valve seats and out of contact with the guide surface and lateral walls of the valve body.

2. In a valve, the combination of a body having a valve chamber provided with inlet and outlet ports in alinement and oppositely directed valve seats therefor and also having a straight guide surface arranged in the side wall intermediate of the valve seats and laterally disposed with respect to the inlet and outlet ports, with a crank shaft journaled in the body to one side of the straight guide surface and having a crank pin on its end within the valve chamber, valve pieces for the valve seats and spring-pressed in contact therewith, and a link journaled upon the crank pin and carrying the spring-pressed valve pieces and said link having a flat edge adapted to the guide surface of the body and acting as an abutment to the crank pin at each end of its movement to limit its throw and extreme oscillations of the crank shaft and said link projecting beyond the perimeters of the valve pieces and adapted to be guided with the valve pieces along the straight guide surface during its oscillation under the action of the crank pin in opening and closing the valve.

3. In a valve, the combination of a valve body having a valve chamber provided with oppositely directed valve seats and inlet and outlet ports through said seats in alinement, with a rock-shaft journaled in the body and having a crank-shaped inner end arranged within the valve chamber, two oppositely directed valve pieces respectively adapted to the opposite valve seats, a spring between the valve pieces for yieldingly forcing them toward their respective seats, a unitary link loosely hinged to the crank pin and having a large aperture in which the valve pieces are received to hold them in alinement and by which link they are moved, and means within the valve chamber for causing the link to assume a definite position at the extreme end of its movement to position the valve pieces in alinement with the ports, said means comprising a contacting surface extending from the lateral inner wall of the valve chamber, and an extension on the link which fits to the said wall to support the said link at the extreme end of its movement and prevent further movement of the crank.

4. In a valve, the combination of a valve body having a valve chamber and oppositely directed valve seats with ports opening therethrough in alinement and also a lateral abutment and guide wall, a rock-shaft journaled in the valve body to one side of the ports and having on its inner end an annular flange seating upon the interior of the valve body and also provided with a crank pin, a link loosely hinged to the crank pin and having a lateral extension at one side arranged to contact with the inner lateral wall of the valve body to limit its movement when in position of its extreme movement, oppositely directed spring actuated valve pieces loosely carried in the free end of the link for controlling the respective ports, and means for giving to the rock-shaft approximately a semi-revolution for opening or closing the valve, the construction being such that the crank pin swings in an arc of a circle to one side of a line through the axis of the rock-shaft and the centers of the ports and the movement of said crank being in a direction away from the contacting side of the link with the lateral guide wall of the body at the initial opening of the valve and toward it in the final closing of the valve.

In testimony of which invention I hereunto set my hand.

GEORGE P. HAYNES.

Witnesses:
CHRISTINE E. CHASE,
WM. F. MADILL.